(12) United States Patent
Schmierer

(10) Patent No.: US 8,562,189 B2
(45) Date of Patent: Oct. 22, 2013

(54) MOULDED LIGHTING ELEMENT

(75) Inventor: Arne Schmierer, Kirchheim (DE)

(73) Assignee: SMR Patents S.a.r.l., Luxembourg (LU)

( * ) Notice: Subject to any disclaimer, the term of this patent is extended or adjusted under 35 U.S.C. 154(b) by 292 days.

(21) Appl. No.: 12/763,318

(22) Filed: Apr. 20, 2010

(65) Prior Publication Data

US 2010/0265730 A1    Oct. 21, 2010

(30) Foreign Application Priority Data

Apr. 20, 2009   (DE) ................... 10 2009 019 092

(51) Int. Cl.
*B60Q 1/00* (2006.01)
(52) U.S. Cl.
USPC ........................................................ 362/494
(58) Field of Classification Search
USPC ................... 362/555, 501, 494, 548–549
See application file for complete search history.

(56) References Cited

U.S. PATENT DOCUMENTS

| | | | | |
|---|---|---|---|---|
| 4,475,100 A | * | 10/1984 | Duh | 362/494 |
| 5,059,015 A | * | 10/1991 | Tran | 359/844 |
| 5,486,986 A | * | 1/1996 | Brada | 362/85 |
| 5,669,699 A | * | 9/1997 | Pastrick et al. | 362/494 |
| 6,028,694 A | * | 2/2000 | Schmidt | 359/264 |
| 6,152,590 A | * | 11/2000 | Furst et al. | 362/545 |
| 6,695,465 B2 | | 2/2004 | Apfelbeck | |
| 7,677,775 B2 | | 3/2010 | Oehmann | |
| 2004/0090795 A1 | * | 5/2004 | Kim | 362/555 |
| 2005/0237757 A1 | | 10/2005 | Weng | |
| 2005/0276058 A1 | * | 12/2005 | Romas et al. | 362/494 |
| 2008/0316054 A1 | | 12/2008 | Lynam et al. | |

FOREIGN PATENT DOCUMENTS

| | | |
|---|---|---|
| DE | 10039760 | 3/2002 |
| DE | 10258892 | 7/2004 |
| EP | 1391348 | 2/2004 |
| EP | 1508476 | 2/2005 |
| WO | 0142048 | 6/2001 |

OTHER PUBLICATIONS

German Search Report for German Patent Application 10 2009 019 092.9-31 dated Mar. 30, 2010.
Conrad Faszination Elektronik und Technik 2005/2006; Hauptkatalog 2005/2006; www.conrad.de.

* cited by examiner

*Primary Examiner* — Julie Shallenberger
(74) *Attorney, Agent, or Firm* — Reising Ethington PC

(57) ABSTRACT

An exterior mirror is proposed, which is configured with an LED as a signal light in the simplest manner. A contact body at the LED facilitates simple assembly and simple contacting of the LED.

1 Claim, 6 Drawing Sheets

MOULDED LIGHTING ELEMENT

The invention is based on a priority patent application DE 102009019092.9 which is hereby incorporated by reference.

BACKGROUND OF THE INVENTION

1. Field of the Invention

The invention relates to an exterior mirror with an optical display for vehicles, which is installed at a designated position on the mirror, e.g. in the mirror head.

2. Description of the Related Art

Conventional exterior mirrors have a design which facilitates folding the mirror head relative to the mirror base backward in driving direction of the vehicle by hand or through a motor. Furthermore, the mirror glass support in the mirror head is typically adjustable from the interior of the vehicle. This assures perfect vision for the driver, which achieves a high level of traffic safety. Many exterior mirrors comprise a signal light, which is provided at the front side of the mirror housing in driving direction. However, the signal light is not recognizable or not sufficiently recognizable for road users located besides or behind the exterior mirror. Therefore, additional LEDs are being used, which radiate opposite to the driving direction and which are integrated in the signal light at the outermost edge of the exterior mirror. According to ECE regulations, an additional signal light in the exterior mirror shall illuminate a portion starting at 5° from the vehicle longitudinal axis up to 60° from the vehicle longitudinal axis opposite to the driving direction.

Many solutions for signal lights in the exterior mirror are known in the prior art, thus signal light modules are integrated into the housing of an exterior mirror. These signal light modules include light wave conductors, reflectors, printed circuit boards, lenses and cover plates and illuminants. Due to the known advantages, LEDs are being used as illuminants more and more.

An exterior mirror with a signal light is known from EP 1120312, which comprises a light module in which a plurality of LEDs shine through openings of a reflector. The LED which is disposed at the outermost edge of the exterior mirror has a radiation direction which complies with legal regulations. The beam forming is achieved through the reflector. The entire signal light module is clipped into the housing of the exterior mirror and electrically contacted through a plug connection. The configuration of the signal light module is complex and expensive.

Another solution is known from DE 102004025369. In order to minimize the signal light module, this document proposes a small signal light module, which is disposed exchangeable at the periphery of the exterior mirror. The module is retained in a mounted component that is connected to the mirror support.

Furthermore, indicators configured as warning signals for driver assistance systems are known from the prior art.

Thus, US 20080316054 shows prefabricated modules, which are provided with light windows, printed circuit boards and inserted into the exterior mirror. The light windows thus terminate flush with the contour of the exterior mirror.

SUMMARY OF THE INVENTION

It is the object of the invention to configure an exterior mirror, so that the light rays emitted by the signal light are properly visible without making the configuration of the signal light module overly complex.

The signal light of the exterior mirror according to the invention radiates the light over a large angular range at a slant angle backward, so that the road users disposed besides or behind the exterior mirror can detect the intention of the driver to turn left or right reliably and distinctly. This assures a high level of traffic safety. Simultaneously, the illumination is also achieved by a single LED without complex light modules.

The exterior mirror according to the invention comprises adapted receivers into which a minimal signal light insert is inserted. The minimal signal light is thus comprised of an LED which is advantageously encased through injection molding and then fitted into the receiver. Advantages are reducing the amount of material and the number of components and a high flexibility in configuring the exterior mirror. Standardizing the minimal signal light is another advantage.

DETAILED DESCRIPTION OF THE DRAWINGS

Figure 1:
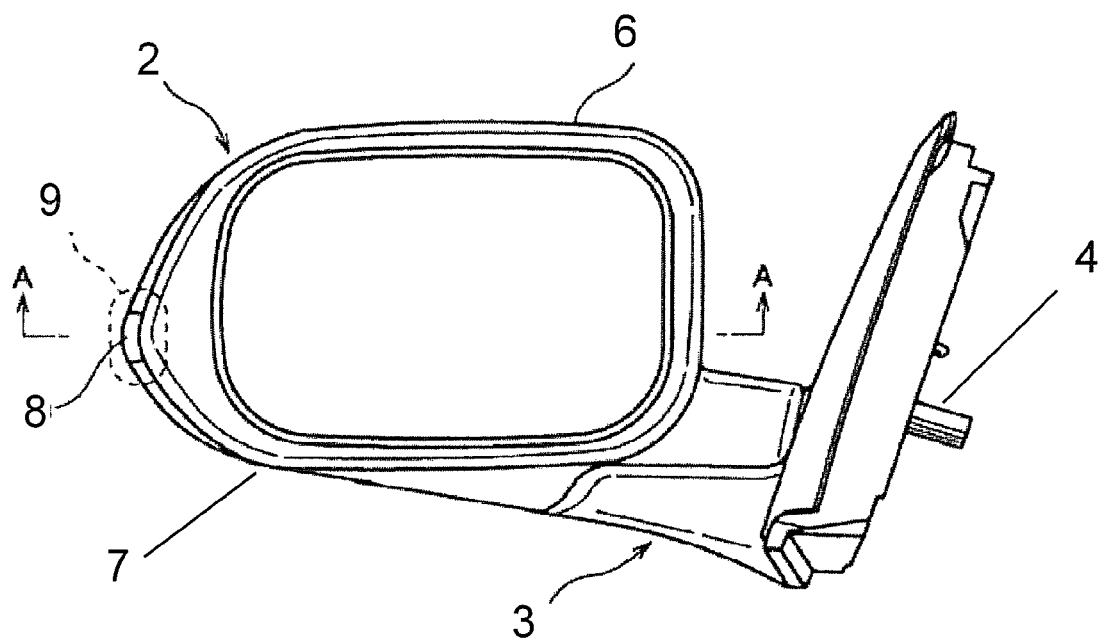
FIG. 1 shows an embodiment of an exterior mirror.

FIG. 1 shows an exterior mirror 1 which is comprised of a mirror head 2 and a mirror base 3. The exterior mirror 1 is bolted to a vehicle through its mirror base 3. Thus, the mounting plate 4 is bolted to the vehicle. An exterior mirror 1 of this type comprises a reflective element 5 which is fitted into an opening of the mirror housing 6. The reflecting element 5 is enclosed by a mirror frame 7. An opening 8 is provided in the mirror frame 7, into which opening a signal light is installed.

Figure 2:
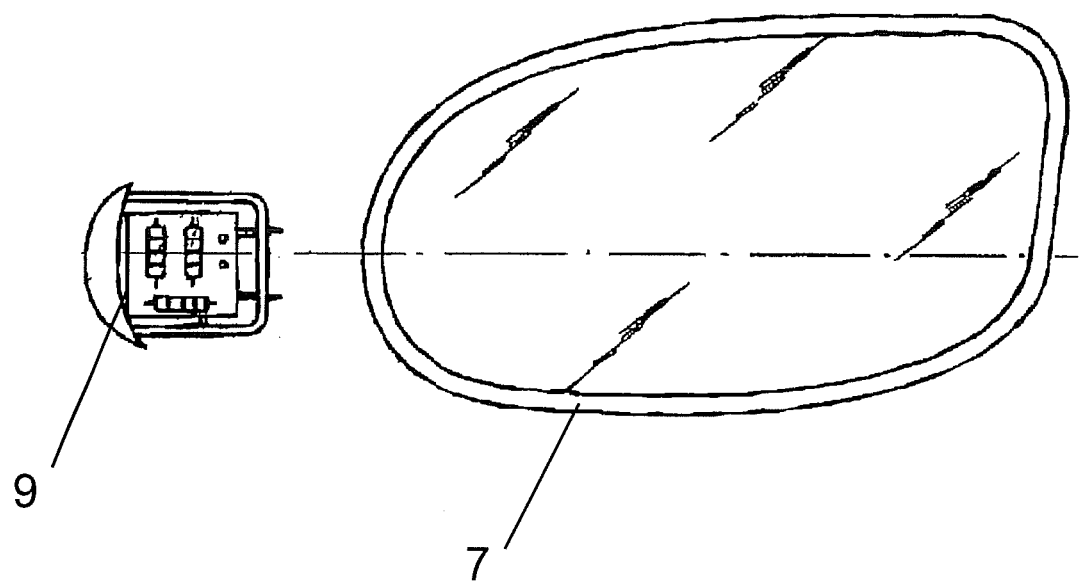
FIG. 2 shows a prior art embodiment.

FIG. 2 describes a prior art embodiment. Thus, a signal light 9 is inserted into the frame 7 of an exterior mirror. The signal light 9 is configured as a separate module in this embodiment, so that it can be installed and removed in a simple manner.

Figure 3:
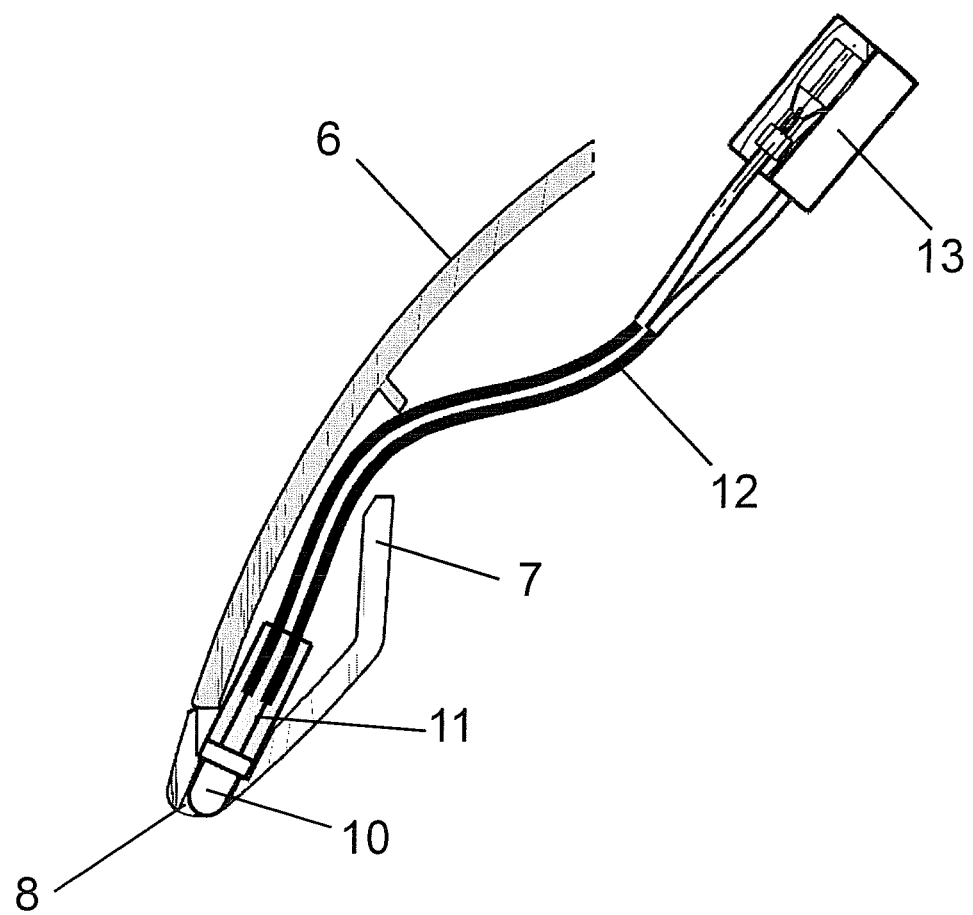
FIG. 3 shows a solution according to the invention.

The solution according to the invention is shown in FIG. 3 in a longitudinal sectional view through the mirror along the axis A-A of FIG. 1. The detail in FIG. 3 shows a portion of the mirror housing 6, at which the mirror frame 7 is attached. A circular opening 8 is disposed in the mirror frame 7. A LED 10 protrudes with its plastic dome into the circular opening 8. The connections of the LED at the cable 12 are soldered and subsequently encased through injection molding to form a watertight contact body 11, which is used for installing the LED in the mirror.

The contact body 11 does not only establish the contact between the cable and the LED and seals the electrical contact against moisture, but it is also used as a mounting element for installation in the mirror and protects the LED against the effects of vibrations. The short cable strand 12 ends in a flat plug 13. The configuration of the mirror with its mirror frame is selected, so that the contact body 11 of the LED is wedged against the housing walls of the exterior mirror. The LED with its integrally molded contact body 11 is pressed in, in this example between the walls of the housing and the mirror frame. The configuration of the two components is selected, so that the contact body is securely wedged when the LED is installed so it is safely positioned.

Figure 4:
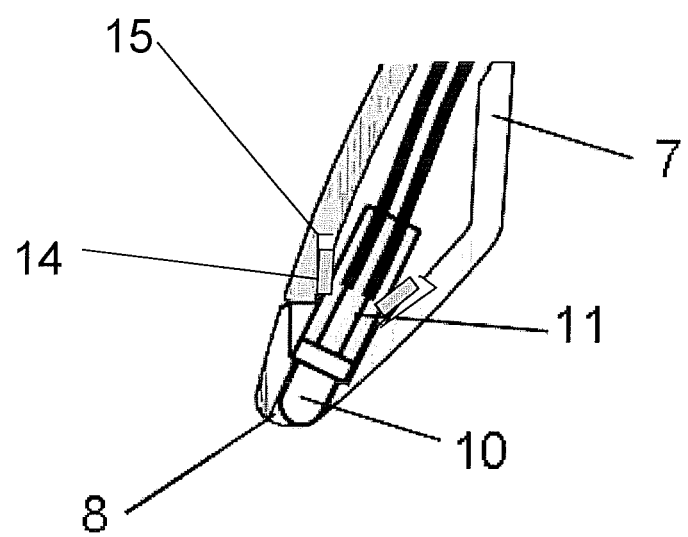
FIG. 4 shows another embodiment.

In another embodiment, the contact body 11 is injection molded or cast as an element of a clip connection. FIG. 4 shows a possible embodiment. The contact body 11 comprises lugs 14, which are integrally injection molded thereon. The mirror housing 6 and the mirror frame 7 respectively comprise engagement recesses 15. During assembly, the contact body 11 is pushed between the mirror frame 7 and the housing, thus the lugs 14 are applied to the body. In the snap lock position, the elastic lugs are spread off and interlock in the target position.

In another embodiment, the contact body is inserted into the mirror housing, which comprises a receiver for this purpose, e.g. in the form of ribs. Subsequently, the mirror frame is plugged on, thus fixating the contact body with the LED.

The contact body is produced in a matching shape, e.g. as a cylindrical body or as a cuboid. When a clip connection is intended, the contact body is integrally fabricated with a device for connecting with the mirror at any position of the mirror housing, the mirror base and its cover and the mirror frame. The manufacturing process is known in the art. The contact body can be injection molded or cast.

Figure 5:
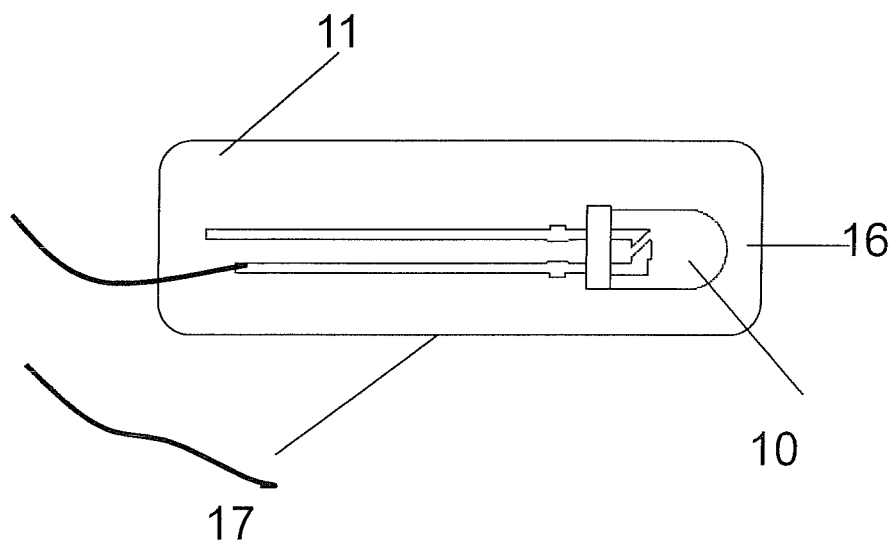
FIG. 5 shows a LED completely encased through injection molding.
Figure 6:
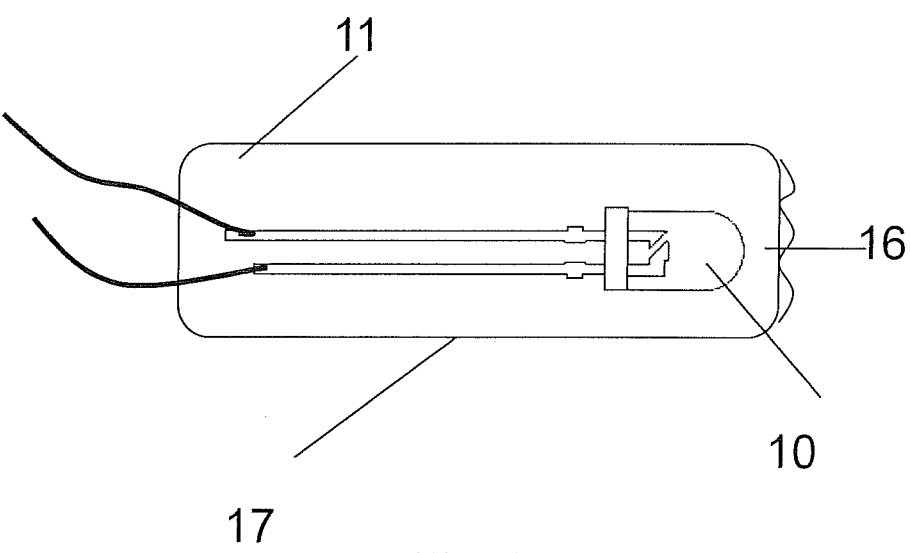
FIG. 6 shows another embodiment.

Another embodiment of the invention is shown in FIGS. 5 and 6. The LED is completely encased with plastic through injection molding in this embodiment. This increases the protection for the LED and possibly occurring problems at the contact location between the LED and the contact body are reduced. The contact body extends at least over the length of the LED and covers the soldered connection with the cables and also covers the preexisting plastic dome of the LED. Thus, attachment structures can be applied along the longitudinal surfaces 17, e.g., ears, lugs or snap connections.

Another advantage of complete encasement through injection molding is that the face 16 of the contact body is fabricated with a structure. The optical radiation characteristics can be determined through integrated surface structures like waves, prisms, grooves or Fresnel lens structures.

It is an advantage of the invention that the mirror head does not require a light window for the signal light. In the prior art, the signal lights are installed, so that they are protected against the ambient by transparent light windows. The signal lights comprise a light window in the form of a transparent cover pane, which is used for weather protection and also as a light conductor in some embodiments, regardless whether the signal lights are provided in modular form or as a fixed installation in the exterior mirror.

On the other hand, the solution according to the invention only comprises openings in the mirror housing at the locations where light is to be emitted.

The invention uses the plastic dome of the LED as a light window. The LED is comprised of a printed circuit board with a semiconductor chip, which is encased with plastic material through injection molding. The plastic dome is used for protecting the electrical components and for defining the beam. The plastic dome protrudes directly into an opening in the mirror fairing. Thus, the plastic dome of the LED does not seal the opening. In order to provide simple assembly, the opening in the mirror fairing is slightly larger than the plastic dome of the LED.

Elliptical LEDs, whose radiation characteristics have an elliptical shape, are used for illuminating the prescribed portion. Using a LED GLI ATL5/9-Y for a signal light, which LED illuminates the legally required field without additional measures, is an exemplary embodiment.

In the alternative embodiment, the face of the contact body directly protrudes into the opening in the mirror head and forms the desired radiation characteristics through the surface structure. Also here, the face does not seal the opening in the mirror fairing.

Figure 7:
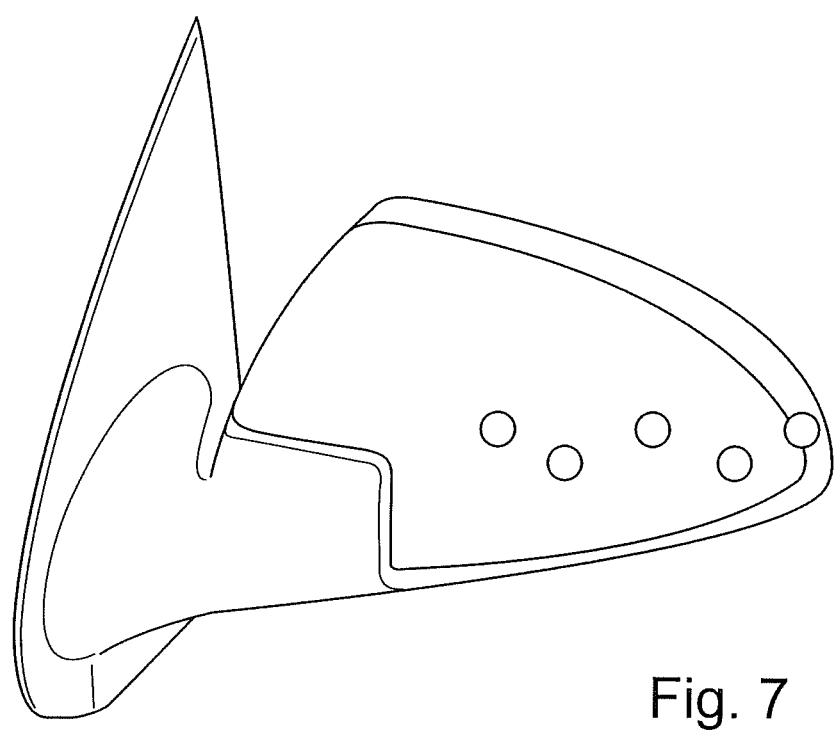
FIG. 7 shows an exterior mirror with several LEDs.

The invention is thus not limited to using a single minimum LED at the outside of the mirror. FIG. 7 shows the schematic of an exemplary solution. Several openings are provided in the mirror housing, wherein an alternating structure is selected for this embodiment. Any shape and any design are conceivable. The openings for the LEDs are provided in the mirror housing or in the mirror base.

Furthermore, the invention is not limited to an application as a signal light. When a weaker LED is used, a warning display can be provided in the mirror housing or in the mirror base through the embodiment of the contact body according to the invention. The mirror housing or the mirror base comprises one or plural openings for receiving an LED.

The LED which is used as a warning signal, e.g. when a vehicle approaches in the dead angle, is inserted into the opening. This embodiment of the warning display has the advantage that only one mirror type needs to be produced and the small LEDs are only installed when it is required by the configuration with a dead angle detection system. When smaller LEDs are selected, the openings provided in the exterior mirror are not large and do not catch attention either, when they are not configured with LEDs.

Design advantages can be derived from providing the openings in a continuous pattern. The LEDs can have different colors in order to indicate an increasingly critical danger situation through a color.

REFERENCE NUMERALS AND DESIGNATIONS 1 exterior mirror
2 mirror head
3 mirror base
4 plate
5 reflecting element
6 mirror housing
7 mirror frame
8 opening
9 signal light
10 LED
11 contact body
12 cable
13 flat plug
14 ear
15 snap-in recesses
16 face
17 side of contact body

What is claimed is:

1. A method for producing an exterior mirror for a motor vehicle, wherein the exterior mirror includes an optical display installed at a designated position on the exterior mirror, the method comprising the steps of:
   providing an optical indicator by soldering contacts of a LED to a cable and integrally molding or casting a contact body about the contacts of the LED and of the cable for sealing the contacts against moisture;
   providing the exterior mirror with at least one opening for inserting the optical indicator, with the exterior mirror comprising a mirror head and a mirror base and the associated fairing comprised of mirror housing, mirror frame and mirror base fairing together forming at least one receiver; and pressing the LED with the contact body into the receiver such that the LED and the contact body are fitted in the receiver and the LED protrudes into the opening.

* * * * *